(12) United States Patent
Zhang et al.

(10) Patent No.: US 12,330,097 B1
(45) Date of Patent: Jun. 17, 2025

(54) SOLID-LIQUID SEPARATION MECHANISM AND SOLID-LIQUID SEPARATION METHOD FOR GRAIN FERMENTATION

(71) Applicant: Harbin University of Commerce, Heilongjiang (CN)

(72) Inventors: Na Zhang, Heilongjiang (CN); Yang Yang, Heilongjiang (CN); Chunmin Ma, Heilongjiang (CN); Bing Wang, Heilongjiang (CN); Xin Bian, Heilongjiang (CN); Guang Zhang, Heilongjiang (CN); Jiaduo Niu, Heilongjiang (CN); Yongsheng Zhu, Heilongjiang (CN); Fengxiang Lin, Heilongjiang (CN); Haiyan Wang, Heilongjiang (CN); Shuang Wu, Heilongjiang (CN)

(73) Assignee: Harbin University of Commerce, Harbin (CN)

( * ) Notice: Subject to any disclaimer, the term of this patent is extended or adjusted under 35 U.S.C. 154(b) by 0 days.

(21) Appl. No.: 19/014,185

(22) Filed: Jan. 8, 2025

(51) Int. Cl.
| | | |
|---|---|---|
| *B01D 33/15* | (2006.01) |
| *B01D 33/46* | (2006.01) |
| *B01D 33/56* | (2006.01) |
| *B01D 33/80* | (2006.01) |
| *B04B 3/00* | (2006.01) |

(52) U.S. Cl.
CPC ......... *B01D 33/155* (2013.01); *B01D 33/465* (2013.01); *B01D 33/56* (2013.01); *B01D 33/801* (2013.01); *B04B 3/00* (2013.01); *B01D 2221/06* (2013.01)

(58) Field of Classification Search
CPC .... B01D 33/155; B01D 33/465; B01D 33/56; B04B 3/00
See application file for complete search history.

(56) References Cited

U.S. PATENT DOCUMENTS 3,443,696 A * 5/1969 Schutte ................ B01D 33/727
55/408

FOREIGN PATENT DOCUMENTS

| CN | 219481901 U | | 8/2023 |
| CN | 219722186 U | | 9/2023 |
| CN | 220090722 U | * | 11/2023 |
| CN | 117298713 A | * | 12/2023 |

* cited by examiner

*Primary Examiner* — Liam Royce (57) ABSTRACT

The present disclosure relates to the technical field of solid-liquid separation of grain fermentation, and provides a solid-liquid separation mechanism and solid-liquid separation method for grain fermentation. A filter screen cylinder mechanism is inserted and mounted at an upper end of a rotating seat. According to the present disclosure, the rotation of the filter screen cylinder mechanism and a rotating disc mechanism has a speed difference, to realize the rolling and solid-liquid separation of fermented grain on an inner wall of the filter screen cylinder mechanism by rolling cylinders; and the rolling and solid-liquid separation is performed on fermented grain on an inner wall of the filter screen plate by the rolling cylinders, and the liquid in the fermented grain on the inner wall of the filter screen plate is rolled out, achieving a more thorough solid-liquid separation.

4 Claims, 10 Drawing Sheets

SOLID-LIQUID SEPARATION MECHANISM AND SOLID-LIQUID SEPARATION METHOD FOR GRAIN FERMENTATION

CROSS-REFERENCE TO RELATED APPLICATION

This application claims priority of Chinese Patent Application No. 202410316079.2, filed on Mar. 20, 2024, the entire contents of which are incorporated herein by reference.

TECHNICAL FIELD

The present disclosure relates to the technical field of solid-liquid separation of grain fermentation, and in particular to a solid-liquid separation mechanism and solid-liquid separation method for grain fermentation.

BACKGROUND

Solid-liquid separation of grain fermentation refers to the separation of solid and liquid in fermentation broth during grain fermentation. The purpose of solid-liquid separation is to obtain pure fermentation products, usually liquid parts, for subsequent treatment, purification and product preparation. The common way of solid-liquid separation of grain fermentation is centrifugal separation, which is limited by a rotation speed of a centrifugal cylinder, so that the centrifugal force on fermented grain in the centrifugal cylinder will not increase indefinitely, and there may be insufficient centrifugal force, leading to poor solid-liquid separation efficiency of grain fermentation. In addition, the fermented grain in the centrifugal cylinder are easy to pile up after caking, which is not conducive to the uniform distribution of fermented grain on the surface of the centrifugal cylinder after the centrifugal cylinder rotates smoothly, and is also not conducive to the thorough solid-liquid separation of grain fermentation. Therefore, a solid-liquid separation mechanism and a solid-liquid separation method for grain fermentation are introduced.

SUMMARY

An object of the present disclosure is to provide a solid-liquid separation mechanism and a solid-liquid separation method for grain fermentation, to solve the problems raised in the above background.

To achieve the above object, the present disclosure provides the following technical solutions.

A solid-liquid separation mechanism for grain fermentation includes a solid-liquid separation tank. A bottom supporting frame is arranged at an interior of the solid-liquid separation tank, a rotating seat is arranged at a middle part of an upper end of the bottom supporting frame, a filter screen cylinder mechanism is inserted and mounted at an upper end of the rotating seat, fermented grain at an interior of the filter screen cylinder mechanism is subjected to centrifugal solid-liquid separation when the filter screen cylinder mechanism rotates, and rolling cylinders are connected to an interior of the filter screen cylinder mechanism through a rotating disc mechanism;

a top of the solid-liquid separation tank is arranged with an end cover mechanism, a motor for driving a rotating shaft gear mechanism is arranged on the end cover mechanism, and the motor drives the rotating seat through the rotating shaft gear mechanism to drive the filter screen cylinder mechanism to rotate at the interior of the solid-liquid separation tank, causing the rotating disc mechanism to rotate at the interior of the filter screen cylinder mechanism, and the rotation of the filter screen cylinder mechanism and the rotating disc mechanism to have a speed difference, realizing the rolling and solid-liquid separation of the fermented grain on an inner wall of the filter screen cylinder mechanism by the rolling cylinders; and the rotating disc mechanism also reciprocates up and down when rotating at the interior of the filter screen cylinder mechanism, causing the rotating disc mechanism to stir fermented grain at the interior of the filter screen cylinder mechanism.

Preferably, a side of a bottom of the solid-liquid separation tank is arranged with supporting legs, and a middle part of a lower end of the solid-liquid separation tank is connected to the funnel.

Preferably, the bottom supporting frame includes an outer supporting ring and a bottom seat fixed at an interior of the outer supporting ring through a plurality of groups of first connecting plates, a liquid leakage tank is formed between adjacent first connecting plates, and the outer supporting ring is supported on an annular platform at a top of a funnel.

Preferably, the rotating seat is supported at an upper end of the bottom seat, the filter screen cylinder mechanism includes a bottom plate and a top ring seat connected above the bottom plate through a plurality of groups of supporting plates, a filter screen plate is connected between adjacent supporting plates, and upper and lower ends of the filter screen plate are respectively fixed with the top ring seat and the bottom plate; and a lower end of the bottom plate is arranged with a plurality of groups of plug-in columns, and the plug-in columns are inserted into corresponding jacks on the rotating seat.

Preferably, the end cover mechanism includes a cover plate, a sealing ring seat fixed at a lower end of the cover plate and a feeding pipe arranged on a side of an upper end of the cover plate, and handles are also arranged at the upper end of the cover plate;

a hopper is arranged at a top of the feeding pipe, the cover plate is fixed at the top of the solid-liquid separation tank through snap locks, and the motor is fixed at a middle part of the upper end of the cover plate; and a bottom of the feeding pipe extends into the top ring seat, the sealing ring seat is inserted between an outer wall of the top ring seat and an inner wall of the solid-liquid separation tank, and a top of the top ring seat is abutted against a surface of the lower end of the cover plate.

Preferably, the rotating shaft gear mechanism includes a rotating shaft fixed after an output end of the motor penetrates through the cover plate, a big gear and a first pinion arranged at upper and lower ends on the same side of the bottom seat, and a second pinion connected after a bottom of the rotating shaft penetrates through the bottom plate, the rotating seat and the bottom seat, and the second pinion is meshed with the first pinion;

a vertical shaft connected to a middle part of a lower end of the big gear penetrates through the bottom seat and is connected to a middle part of an upper end of the first pinion, the big gear is located in an accommodation groove at a lower end of the rotating seat, an outer gear ring seat is fixed at a middle part of a lower end of the accommodation groove, and the big gear is meshed with the outer gear ring seat; and the rotating shaft gear mechanism also includes an inclined rotating disc fixed at an upper part of the rotating shaft and an annular cylinder sleeved on the rotating shaft, a side of a top of the annular cylinder is connected to a U-shaped groove seat through an L-shaped frame, and a side of the inclined rotating disc is clamped at an interior of the U-shaped groove seat.

The rotating disc mechanism includes a central connecting column and two groups of arc frames fixed on an outer side of the central connecting column through a plurality of groups of second connecting plates, and arc limit seats are connected between the two groups of arc frames;

the central connecting column is sleeved on the rotating shaft, projection plates are fixed on the rotating shaft, the projection plate is located in a bottom circular hole at a middle part of a lower end of the central connecting column, and the projection plates are slidably connected inside sliding grooves on a side of the bottom circular hole;

sides of a top circular hole at a middle part of an upper end of the central connecting column are arranged with slottings, two sides at tail ends of the slottings are arranged with fastening ear plates connected to the sides of the central connecting column, a bottom of the top circular hole is arranged with an annular groove, a bottom of the annular cylinder is connected to a rotating ring seat, the rotating ring seat is arranged in the annular groove, and two groups of fastening ear plates on the same side are fixedly connected by bolts; and upper and lower ends of the arc limit seats are also fixed with L-shaped seats, the rolling cylinders are located in the arc limit seats, two ends of the rolling cylinder are movably connected between upper and lower groups of L-shaped seats, and an inner side wall of the L-shaped seat is also fixed with stirring plates.

The present disclosure also provides a solid-liquid separation method based on a solid-liquid separation mechanism for grain fermentation, specifically including the following steps:

S1, putting the fermented grain into the filter screen cylinder mechanism, and starting the motor, causing the motor to drive the rotating disc mechanism to reciprocate up and down at the interior of the filter screen cylinder mechanism, for stirring the fermented grain at the interior of the filter screen cylinder mechanism;

S2, driving, by the motor, the filter screen cylinder mechanism to rotate at the interior of the solid-liquid separation tank through the rotating shaft gear mechanism, and performing centrifugal solid-liquid separation on the fermented grain at the interior of the filter screen cylinder mechanism; and S3, making the rotating disc mechanism rotate at the interior of the filter screen cylinder mechanism, causing the rolling cylinders to perform rolling and solid-liquid separation on the fermented grain on the inner wall of the filter screen cylinder mechanism.

Compared with the prior art, the present disclosure has the beneficial effects that: the motor of the present disclosure synchronously drives the filter screen cylinder mechanism and the rotating disc mechanism to rotate, and at the same time, also drives the rotating disc mechanism to reciprocate up and down.

The filter screen cylinder mechanism rotates at the interior of the solid-liquid separation tank, and the fermented grain clings to the filter screen plate under the action of centrifugal force, so that the liquid in the fermented grain is subjected to centrifugal solid-liquid separation after being filtered by the filter screen plate under the action of centrifugal force, and the rotation of the filter screen cylinder mechanism and the rotating disc mechanism has a speed difference, to realize the rolling and solid-liquid separation of the fermented grain on an inner wall of the filter screen cylinder mechanism by the rolling cylinders. The rolling and solid-liquid separation is performed on fermented grain on an inner wall of the filter screen plate by the rolling cylinders, and the liquid in the fermented grain on the inner wall of the filter screen plate is rolled out, so that the solid-liquid separation is more sufficient.

The rotating disc mechanism also reciprocates up and down when rotating at an interior of the filter screen cylinder mechanism, so that the rotating disc mechanism stirs fermented grain at an interior of the filter screen cylinder mechanism. After the rotating speed of the filter screen cylinder mechanism is increased, the centrifugal force makes the fermented grain cling to the surface of the inner wall of the filter screen plate, so that the fermented grain can be more evenly dispersed on the surface of the inner wall of the filter screen plate of the filter screen cylinder mechanism after stirring, which is more conducive to improving the efficiency of solid-liquid separation.

Reference numerals and denotations thereof: 1—end cover mechanism; 101—cover plate; 102—sealing ring seat; 103—handle; 104—motor; 105—hopper; 106—feeding pipe; 2—rolling cylinder; 3—rotating disc mechanism;

31—L-shaped seat; 32—stirring plate; 33—arc frame; 34—arc limit seat; 35—central connecting column; 351—annular groove; 352—fastening ear plate; 353—bolt; 354—sliding groove; 355—bottom circular hole; 356—slotting; 36—second connecting plate; 4—filter screen cylinder mechanism; 41—top ring seat; 42—supporting plate; 43—bottom plate; 44—plug-in column; 45—filter screen plate; 5—rotating seat; 51—accommodation groove; 52—outer gear ring seat; 6—bottom supporting frame; 61—outer supporting ring; 62—bottom seat; 63—first connecting plate; 64—liquid leakage tank; 7—rotating shaft gear mechanism; 71—rotating shaft; 72—inclined rotating disc; 73—projection plate; 74—second pinion; 75—big gear; 76—vertical shaft; 77—first pinion; 78—annular cylinder; 79—rotating ring seat; 80—L-shaped frame; 81—U-shaped groove seat; 8—solid-liquid separation tank; 9—supporting leg; 10—funnel; and 11—snap lock.

DETAILED DESCRIPTION

Technical solutions in examples of the present disclosure will be described clearly and completely in the following with reference to the attached drawings in the examples of the present disclosure. Obviously, all the described examples are only some, rather than all examples of the present disclosure. Based on the examples in the present disclosure, all other examples obtained by those of ordinary skill in the art without creative efforts belong to the scope of protection of the present disclosure.

Referring to FIGS. 1-12, the present disclosure provides technical solutions:

Example 1: A solid-liquid separation mechanism for grain fermentation includes a solid-liquid separation tank 8. A side of a bottom of the solid-liquid separation tank 8 is arranged with supporting legs 9, and a middle part of a lower end of the solid-liquid separation tank 8 is connected to a funnel 10. An annular platform is arranged at an interior of a joint of the solid-liquid separation tank 8 and the funnel 10.

Figure 8:
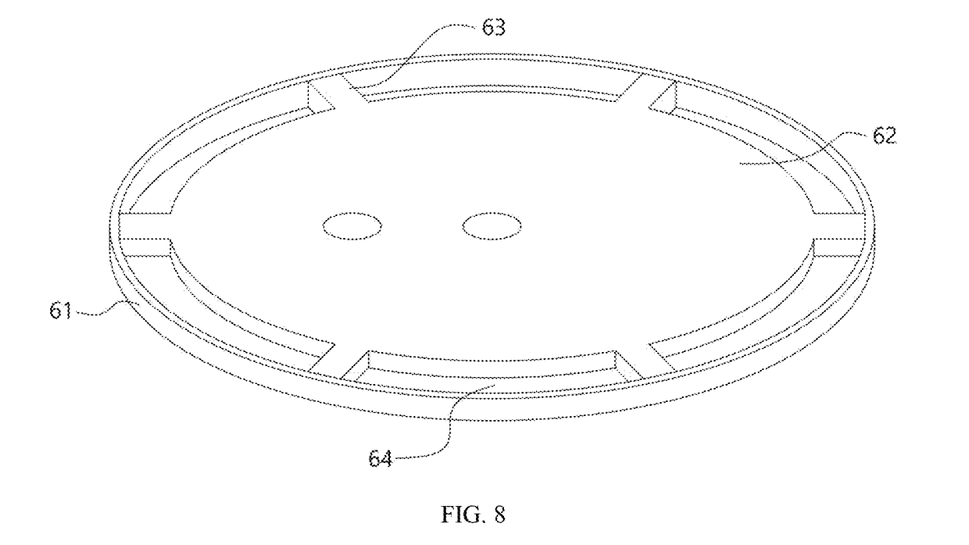
FIG. 8 is a schematic diagram of a three-dimensional structure of a bottom supporting frame of the present disclosure.
Figure 9:
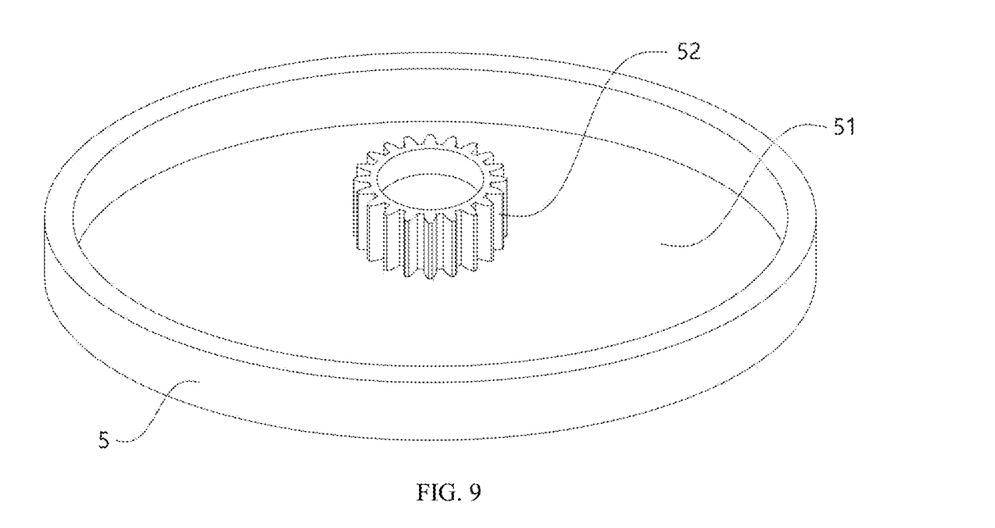
FIG. 9 is a schematic diagram of a three-dimensional structure of the connection between a rotating seat and an outer gear ring seat of the present disclosure.

A bottom supporting frame 6 is arranged at an interior of the solid-liquid separation tank 8, the bottom supporting frame 6 includes an outer supporting ring 61 and a bottom seat 62 fixed at an interior of the outer supporting ring 61 through a plurality of groups of first connecting plates 63, a liquid leakage tank 64 is formed between adjacent first connecting plates 63, and the outer supporting ring 61 is supported on an annular platform at a top of a funnel 10.

Figure 7:
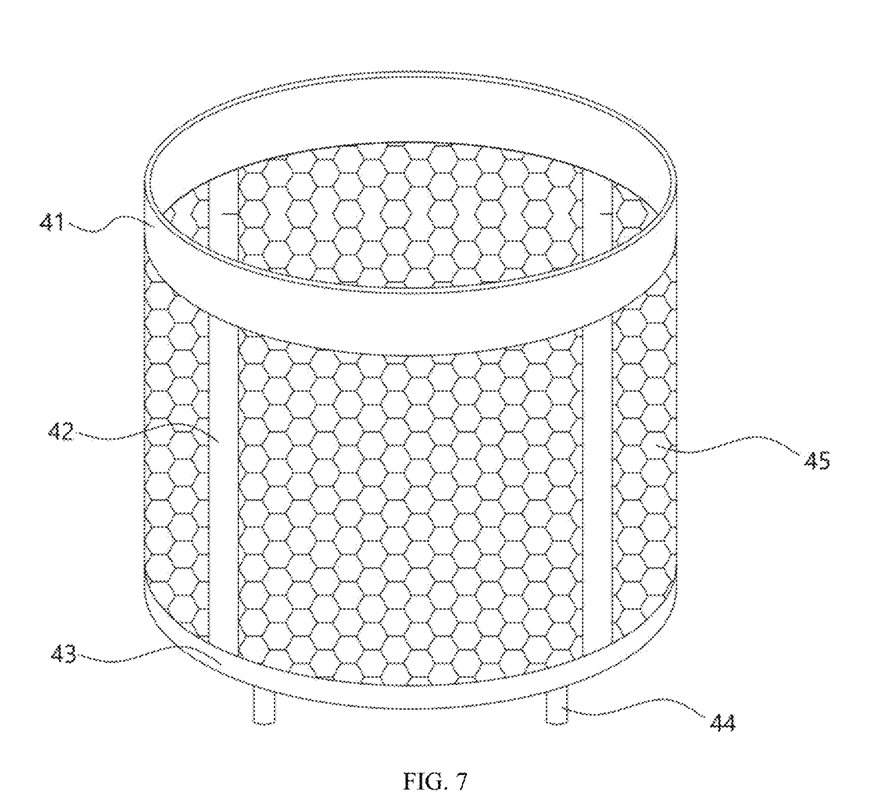
FIG. 7 is a schematic diagram of a three-dimensional structure of a filter screen cylinder mechanism of the present disclosure.

A rotating seat 5 is arranged at a middle part of an upper end of the bottom supporting frame 6, the rotating seat 5 is supported at an upper end of the bottom seat 62, and a filter screen cylinder mechanism 4 is inserted and mounted at an upper end of the rotating seat 5. The filter screen cylinder mechanism 4 includes a bottom plate 43 and a top ring seat 41 connected above the bottom plate 43 through a plurality of groups of supporting plates 42, a filter screen plate 45 is connected between adjacent supporting plates 42, and upper and lower ends of the filter screen plate 45 are respectively fixed with the top ring seat 41 and the bottom plate 43. A lower end of the bottom plate 43 is arranged with a plurality of groups of plug-in columns 44, and the plug-in columns 44 are inserted into corresponding jacks on the rotating seat 5.

Fermented grain at an interior of the filter screen cylinder mechanism 4 is subjected to centrifugal solid-liquid separation when the filter screen cylinder mechanism 4 rotates, and rolling cylinders 2 are connected to an interior of the filter screen cylinder mechanism 4 through a rotating disc mechanism 3.

Figure 1:
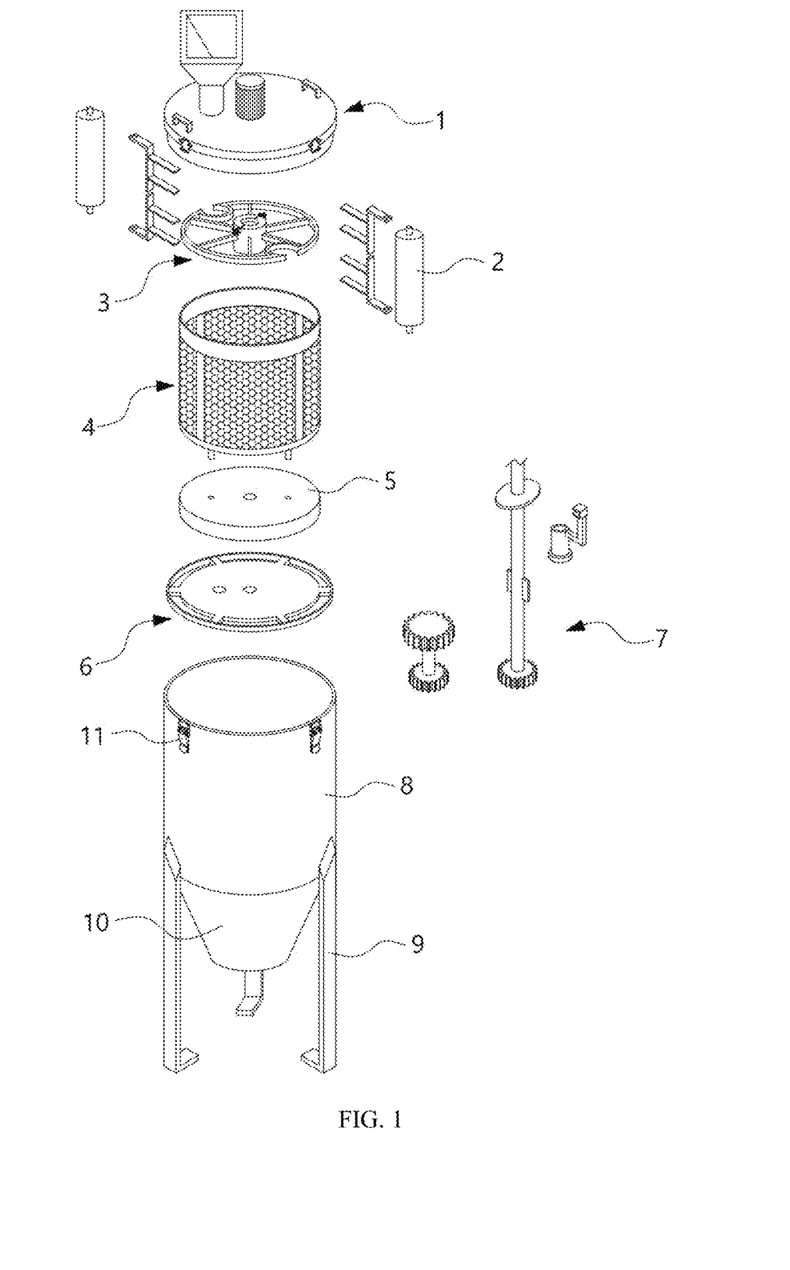
FIG. 1 is a schematic diagram of an exploded structure of a whole assembly of the present disclosure.
Figure 2:
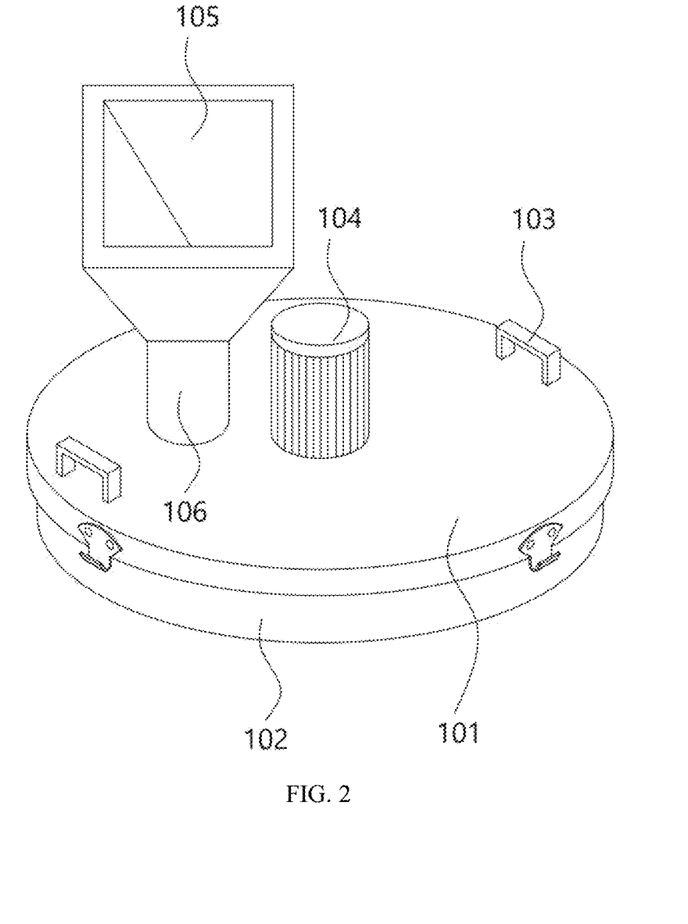
FIG. 2 is a schematic diagram of a three-dimensional structure of an end cover mechanism of the present disclosure.

A top of the solid-liquid separation tank 8 is arranged with an end cover mechanism 1, the end cover mechanism 1 includes a cover plate 101, a sealing ring seat 102 fixed at a lower end of the cover plate 101 and a feeding pipe 106 arranged on a side of an upper end of the cover plate 101, and handles 103 are also arranged at the upper end of the cover plate 101;
- a hopper 105 is arranged at a top of the feeding pipe 106, the cover plate 101 is fixed at the top of the solid-liquid separation tank 8 through snap locks 11, and the motor 104 is fixed at a middle part of the upper end of the cover plate 101; and
- a bottom of the feeding pipe 106 extends into the top ring seat 41, the sealing ring seat 102 is inserted between an outer wall of the top ring seat 41 and an inner wall of the solid-liquid separation tank 8, and a top of the top ring seat 41 is abutted against a surface of the lower end of the cover plate 101.

Figure 10:
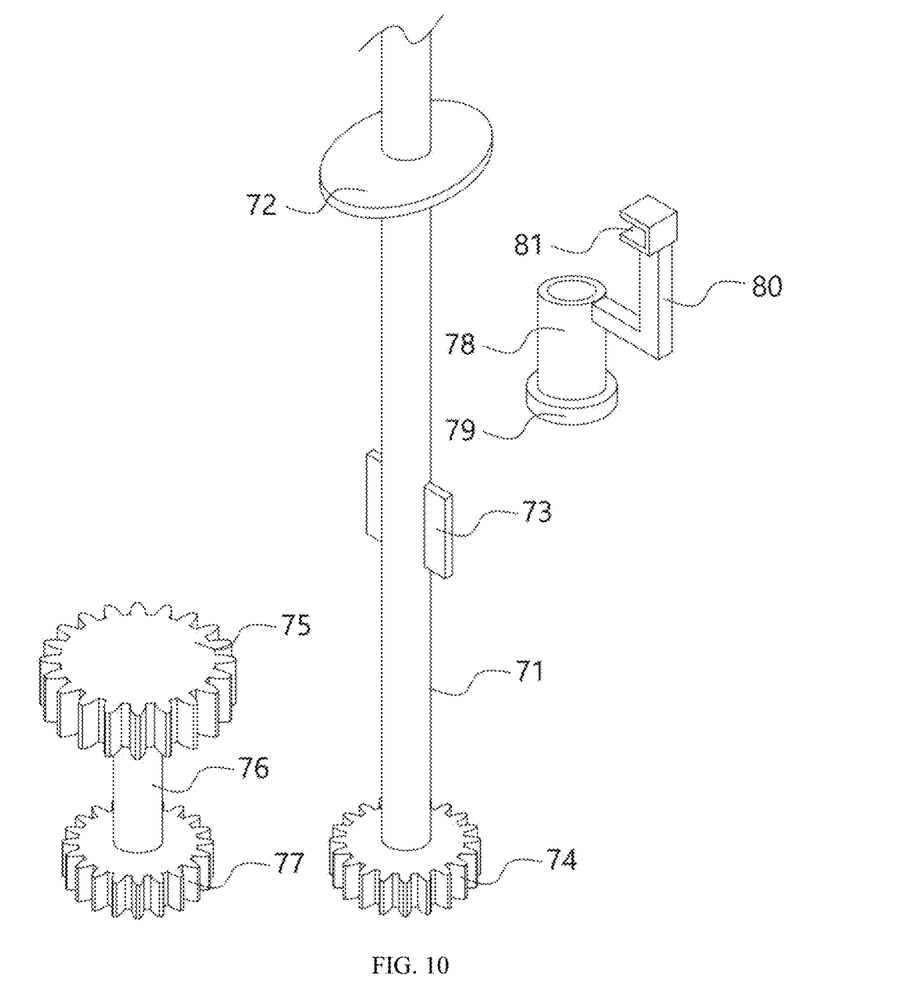
FIG. 10 is a schematic diagram of an exploded structure of a rotating shaft gear mechanism of the present disclosure.

A motor 104 for driving a rotating shaft gear mechanism 7 is arranged on the end cover mechanism 1, the rotating shaft gear mechanism 7 includes a rotating shaft 71 fixed after an output end of the motor 104 penetrates through the cover plate 101, a big gear 75 and a first pinion 77 arranged at upper and lower ends on the same side of the bottom seat 62, and a second pinion 74 connected after a bottom of the rotating shaft 71 penetrates through the bottom plate 43, the rotating seat 5 and the bottom seat 62, and the second pinion 74 is meshed with the first pinion 77;
- a vertical shaft 76 connected to a middle part of a lower end of the big gear 75 penetrates through the bottom seat 62 and is connected to a middle part of an upper end of the first pinion 77, the big gear 75 is located in an accommodation groove 51 at a lower end of the rotating seat 5, an outer gear ring seat 52 is fixed at a middle part of a lower end of the accommodation groove 51, and the big gear 75 is meshed with the outer gear ring seat 52; and
- the rotating shaft gear mechanism 7 also includes an inclined rotating disc 72 fixed at an upper part of the rotating shaft 71 and an annular cylinder 78 sleeved on the rotating shaft 71, a side of a top of the annular cylinder 78 is connected to a U-shaped groove seat 81 through an L-shaped frame 80, and a side of the inclined rotating disc 72 is clamped at an interior of the U-shaped groove seat 81.

Figure 3:
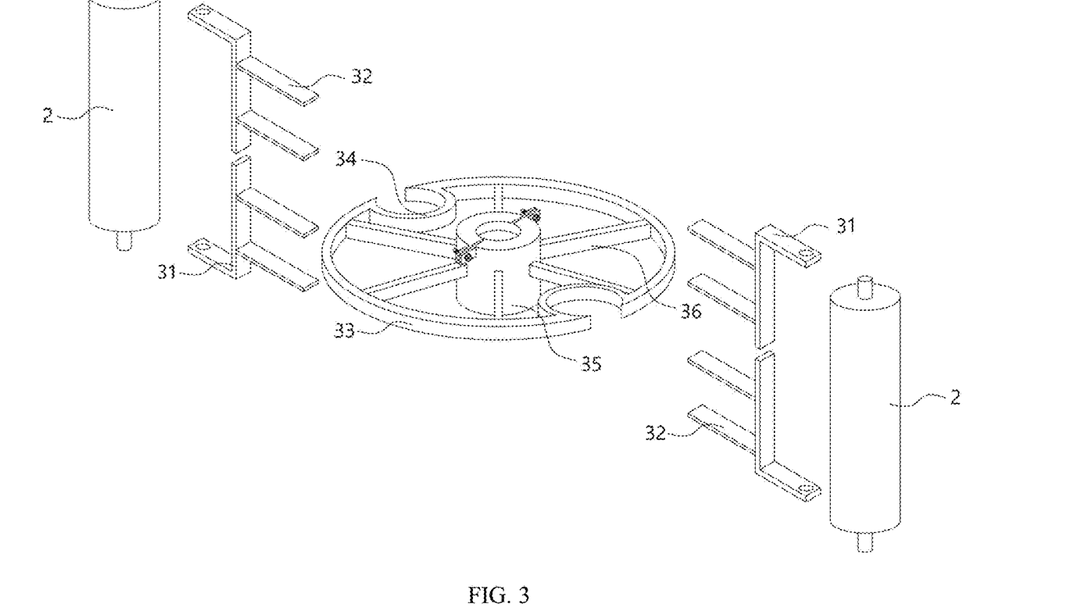
FIG. 3 is a schematic diagram of an exploded structure of the assembly of rolling cylinders and a rotating disc mechanism of the present disclosure.
Figure 4:
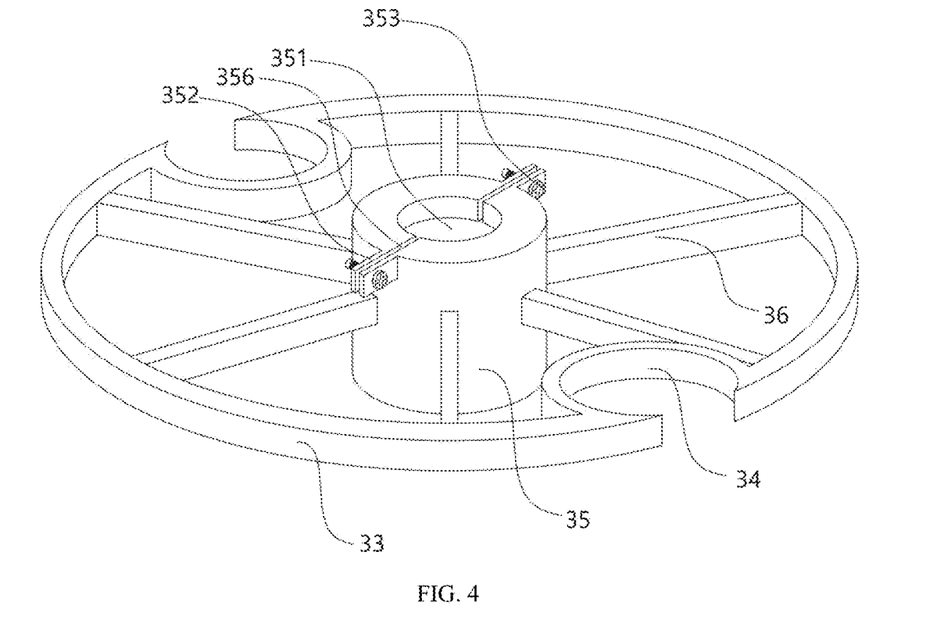
FIG. 4 is a schematic diagram of a three-dimensional structure of the connection between an arc frame and a central connecting column of the present disclosure.
Figure 5:
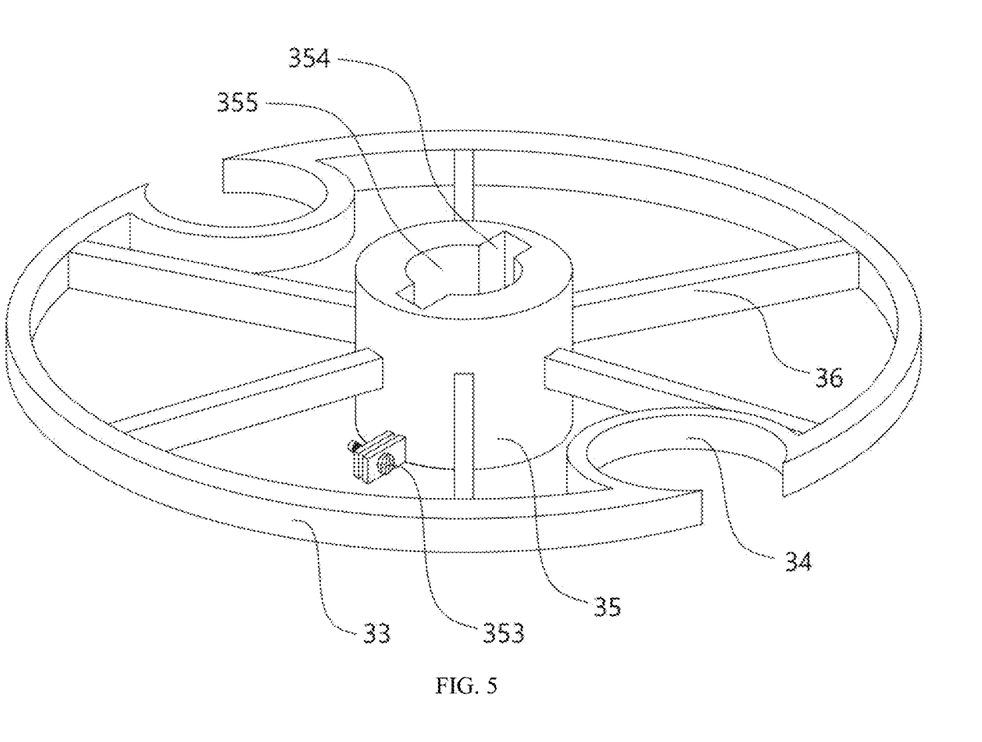
FIG. 5 is a schematic diagram of the three-dimensional structure in FIG. 4 from another perspective of the present disclosure.
Figure 6:
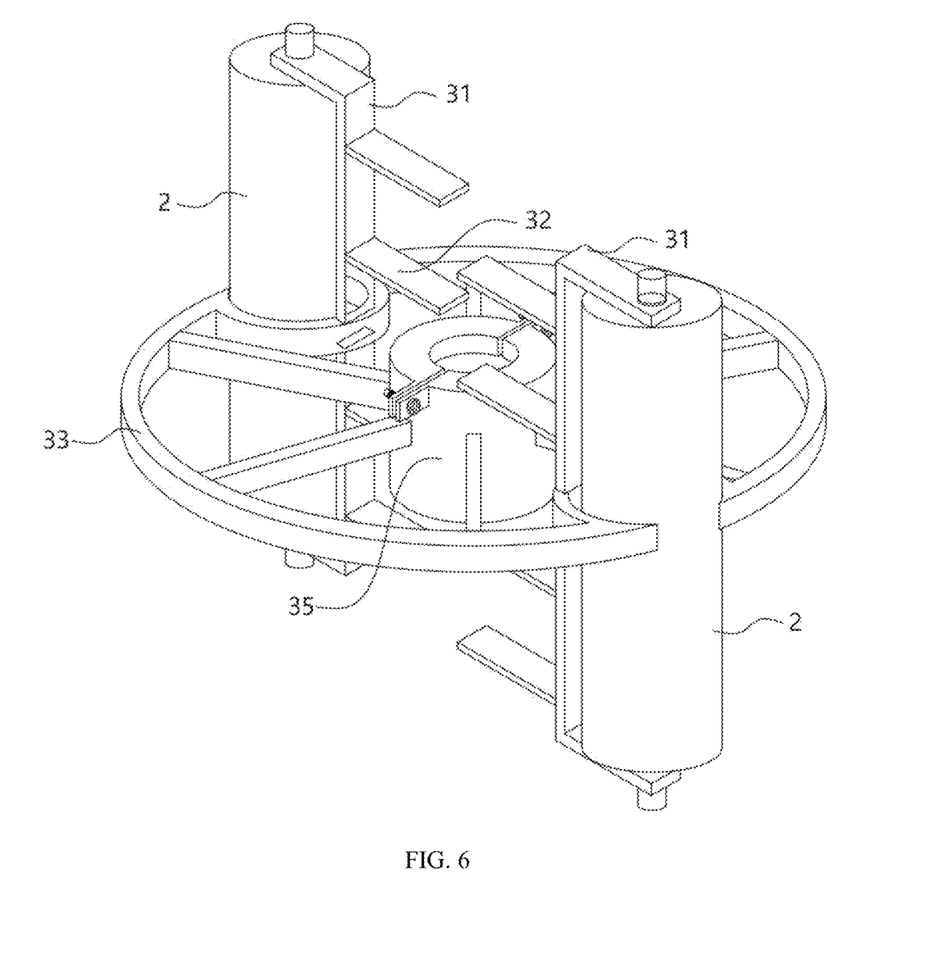
FIG. 6 is a schematic diagram of the assembled three-dimensional structure in FIG. 3 of the present disclosure.

The rotating disc mechanism 3 includes a central connecting column 35 and two groups of arc frames 33 fixed on an outer side of the central connecting column 35 through a plurality of groups of second connecting plates 36, and arc limit seats 34 are connected between the two groups of arc frames 33.

The central connecting column 35 is sleeved on the rotating shaft 71, projection plates 73 are fixed on the rotating shaft 71, the projection plate 73 is located in a bottom circular hole 355 at a middle part of a lower end of the central connecting column 35, and the projection plates 73 are slidably connected inside sliding grooves 354 on a side of the bottom circular hole 355.

When the rotating disc mechanism 3 reciprocates up and down at the interior of the filter screen cylinder mechanism 4, the projection plate 73 slides up and down relative to the sliding groove 354, and it is necessary to ensure that the projection plate 73 never slips off the bottom of the sliding groove 354, so that the rotating shaft 71 can drive the rotating disc mechanism 3 to rotate at the interior of the filter screen cylinder mechanism 4 while ensuring the rotating disc mechanism 3 reciprocates up and down.

Sides of a top circular hole at a middle part of an upper end of the central connecting column 35 are arranged with slottings 356, two sides at tail ends of the slottings 356 are arranged with fastening ear plates 352 connected to the sides of the central connecting column 35, a bottom of the top circular hole is arranged with an annular groove 351, a bottom of the annular cylinder 78 is connected to a rotating ring seat 79, the rotating ring seat 79 is arranged in the annular groove 351, and two groups of fastening ear plates 352 on the same side are fixedly connected by bolts 353; and upper and lower ends of the arc limit seats 34 are also fixed with L-shaped seats 31, the rolling cylinders 2 are located in the arc limit seats 34, two ends of the rolling cylinder 2 are movably connected between upper and lower groups of L-shaped seats 31, and an inner side wall of the L-shaped seat 31 is also fixed with stirring plates 32.

The motor 104 drives the rotating seat 5 through the rotating shaft gear mechanism 7 to drive the filter screen cylinder mechanism 4 to rotate at the interior of the solid-liquid separation tank 8, causing the rotating disc mechanism 3 to rotate at the interior of the filter screen cylinder mechanism 4, and the rotation of the filter screen cylinder mechanism 4 and the rotating disc mechanism 3 to have a speed difference, realizing the rolling and solid-liquid separation of the fermented grain on an inner wall of the filter screen cylinder mechanism 4 by the rolling cylinders 2; and the rotating disc mechanism 3 also reciprocates up and down when rotating at the interior of the filter screen cylinder mechanism 4, causing the rotating disc mechanism 3 to stir fermented grain at the interior of the filter screen cylinder mechanism 4.

When disassembly is required, the snap locks 11 are opened, and the lifting equipment can lift the end cover mechanism 1 through the handles 103, and at the same time, the bottom supporting frame 6, the rotating seat 5, the filter screen cylinder mechanism 4, the rotating disc mechanism 3 and the rolling cylinders 2 can be lifted from the interior of the solid-liquid separation tank 8 together, to wash the inner wall of the solid-liquid separation tank 8, the bottom supporting frame 6, the rotating seat 5, the filter screen cylinder mechanism 4, the rotating disc mechanism 3 and the rolling cylinder 2.

The present disclosure also provides a solid-liquid separation method based on a solid-liquid separation mechanism for grain fermentation, specifically including the following steps:

In S1, the fermented grain was put into the filter screen cylinder mechanism 4, and the motor 104 was started, causing the motor 104 to drive the rotating disc mechanism 3 to reciprocate up and down at the interior of the filter screen cylinder mechanism 4, for stirring the fermented grain at the interior of the filter screen cylinder mechanism 4.

In S2, the filter screen cylinder mechanism 4 was driven by the motor 104 to rotate at the interior of the solid-liquid separation tank 8 through the rotating shaft gear mechanism 7, and centrifugal solid-liquid separation was performed on the fermented grain at interior of the filter screen cylinder mechanism 4.

In S3, the rotating disc mechanism 3 rotated at the interior of the filter screen cylinder mechanism 4, causing the rolling cylinders 2 to perform rolling and solid-liquid separation on the fermented grain on the inner wall of the filter screen cylinder mechanism 4.

Specifically, when in use, the fermented grain is put in through the hopper 105, and the fermented grain falls into the filter screen cylinder mechanism 4 through the feeding pipe 106 under the action of gravity.

A programmable automation controller (PLC) controls the motor 104 to turn on, so that the motor 104 drives the rotating shaft 71 to rotate.

Figure 11:
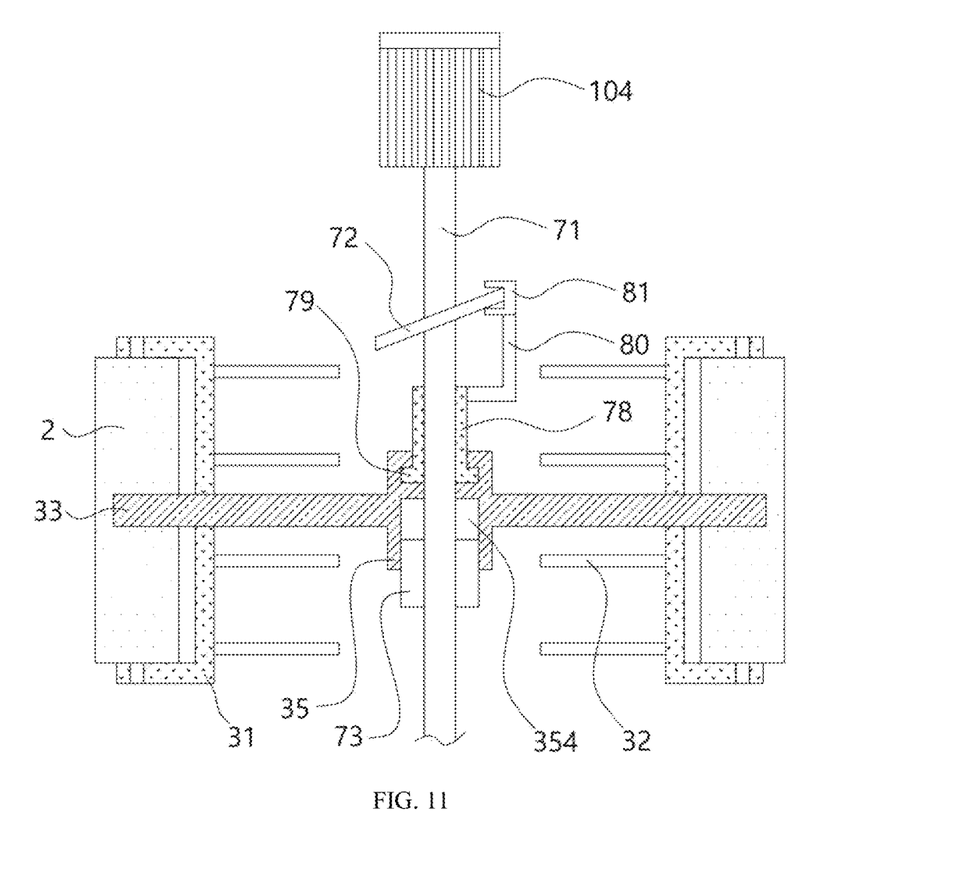
FIG. 11 is a schematic sectional diagram of the connection of rolling cylinders, a rotating disc mechanism, a rotating shaft, an inclined rotating disc and an annular cylinder of the present disclosure.
Figure 12:
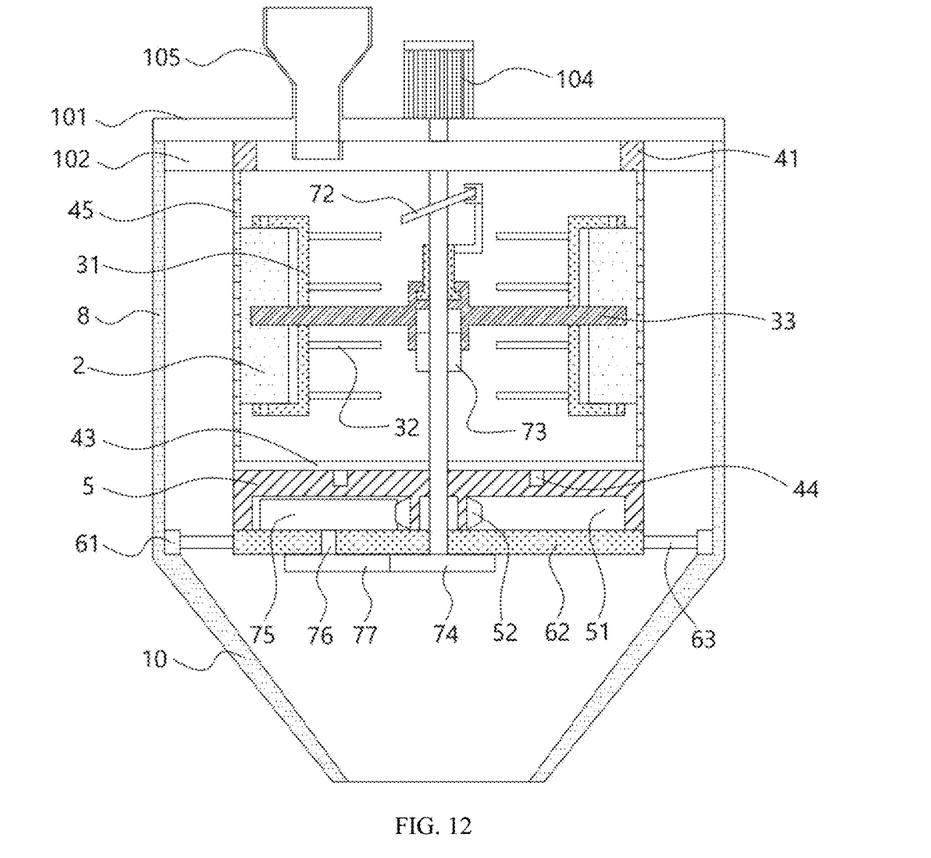
FIG. 12 is a schematic sectional diagram of the assembled end cover mechanism, rolling cylinders, rotating disc mechanism, filter screen cylinder mechanism, rotating shaft gear mechanism and solid-liquid separation tank of the present disclosure.

The rotation of the rotating shaft 71 drives the inclined rotating disc 72 fixed on the rotating shaft 71 to rotate, the inclined rotating disc 72 is obliquely arranged, and a side of the inclined rotating disc 72 is clamped at an interior of the U-shaped groove seat 81, so that when the inclined rotating disc 72 rotates, the L-shaped frame 80 can be pulled by the U-shaped groove seat 81 to move up and down, and the L-shaped frame 80 can pull the annular cylinder 78 to reciprocate up and down along the rotating shaft 71.

At this time, since the rotating ring seat 79 is connected to the bottom of the annular cylinder 78, and the rotating ring seat 79 is arranged in the annular groove 351, when the annular cylinder 78 reciprocates up and down along the rotating shaft 71, the annular cylinder 78 synchronously makes the rotating disc mechanism 3 reciprocate up and down at the interior of the filter screen cylinder mechanism 4, and stirs the fermented grain at the interior of the filter screen cylinder mechanism 4.

When the rotating disc mechanism 3 reciprocates up and down at the interior of the filter screen cylinder mechanism 4, the L-shaped seats 31, the stirring plates 32 and the second connecting plates 36 on the rotating disc mechanism 3 stir the fermented grain at the interior of the filter screen cylinder mechanism 4.

The motor 104 drives the rotating shaft 71 to rotate, so that the second pinion 74 drives the first pinion 77 to rotate. Since the vertical shaft 76 connected to the middle part of the lower end of the big gear 75 penetrates through the bottom seat 62 and is connected to the middle part of the upper end of the first pinion 77, the first pinion 77 rotates to drive the big gear 75 to rotate. Since the outer gear ring seat 52 is fixed at the middle part of the lower end of the accommodation groove 51, the big gear 75 is meshed with the outer gear ring seat 52, and the big gear 75 drives the rotating seat 5 to rotate at the top of the bottom seat 62 through the outer gear ring seat 52.

Dimensions of the second pinion 74 and the first pinion 77 are the same, the dimension of the big gear 75 is larger than that of the first pinion 77, and an outer diameter of the outer gear ring seat 52 is smaller than that of the second pinion 74, so that the rotating speed of the rotating seat 5 is greater than that of the rotating shaft 71.

Since a lower end of the bottom plate 43 is arranged with a plurality of groups of plug-in columns 44, and the plug-in columns 44 are inserted into corresponding jacks on the rotating seat 5, when the rotating seat 5 rotates at the top of the bottom seat 62, the filter screen cylinder mechanism 4 rotates synchronously, and the rotation speed of the filter screen cylinder mechanism 4 is consistent with that of the rotating seat 5.

The filter screen cylinder mechanism 4 rotates at the interior of the solid-liquid separation tank 8, and under the action of centrifugal force, the fermented grain clings to the filter screen plate 45, so that the liquid in the fermented grain is filtered by the filter screen plate 45 and thrown to the inner wall of the solid-liquid separation tank 8, and finally falls to the funnel 10 through the liquid leakage tanks 64 and is discharged through the funnel 10 under the action of gravity.

When the rotating disc mechanism 3 reciprocates up and down at the interior of the filter screen cylinder mechanism 4, because the projection plates 73 fixed on the rotating shaft 71 are slidably connected to the sliding grooves 354 on the side of the bottom circular hole 355, the rotating shaft 71 drives the rotating disc mechanism 3 and the rolling cylinders 2 on the rotating disc mechanism 3 to rotate at the interior of the filter screen cylinder mechanism 4 through the projection plates 73. The rotating speed of the rotating disc mechanism 3 and the rolling cylinders 2 on the rotating disc mechanism 3 is consistent with that of the rotating shaft 71. In this way, the rotation of the filter screen cylinder mechanism 4 and the rotating disc mechanism 3 has a speed difference, the rolling and solid-liquid separation is performed on fermented grain on an inner wall of the filter screen plate 45 by rolling cylinders 2, and the liquid in the fermented grain on the inner wall of the filter screen plate 45 is rolled out, so that the solid-liquid separation is more sufficient.

When the rotating disc mechanism 3 rotates at the interior of the filter screen cylinder mechanism 4, the L-shaped seats 31 and the stirring plates 32 on the rotating disc mechanism 3 stir the fermented grain at the interior of the filter screen cylinder mechanism 4.

While examples of the present disclosure have been shown and described, it is understood by those skilled in the art that various changes, modifications, substitutions and alterations may be made herein without departing from the principles and spirit of the present disclosure, the scope of which is defined by the appended claims and equivalents thereof.

The invention claimed is:

1. A solid-liquid separation mechanism for grain fermentation, comprising a solid-liquid separation tank, wherein a bottom supporting frame is arranged at an interior of the solid-liquid separation tank, a rotating seat is arranged at a middle part of an upper end of the bottom supporting frame, a filter screen cylinder mechanism is inserted and mounted at an upper end of the rotating seat, fermented grain at an interior of the filter screen cylinder mechanism is subjected to centrifugal solid-liquid separation when the filter screen cylinder mechanism rotates, and rolling cylinders are connected to an interior of the filter screen cylinder mechanism through a rotating disc mechanism;

a top of the solid-liquid separation tank is arranged with an end cover mechanism, a motor for driving a rotating shaft gear mechanism is arranged on the end cover mechanism, and the motor drives the rotating seat through the rotating shaft gear mechanism to drive the filter screen cylinder mechanism to rotate at the interior of the solid-liquid separation tank, causing the rotating disc mechanism to rotate at the interior of the filter screen cylinder mechanism, and the rotation of the filter screen cylinder mechanism and the rotating disc mechanism to have a speed difference, realizing the rolling and solid-liquid separation of the fermented grain on an inner wall of the filter screen cylinder mechanism by the rolling cylinders;

the rotating disc mechanism also reciprocates up and down when rotating at the interior of the filter screen cylinder mechanism, causing the rotating disc mechanism to stir fermented grain at the interior of the filter screen cylinder mechanism;

the bottom supporting frame comprises an outer supporting ring and a bottom seat fixed at an interior of the outer supporting ring through a plurality of groups of first connecting plates, a liquid leakage tank is formed between adjacent first connecting plates, and the outer supporting ring is supported on an annular platform at a top of a funnel;

the rotating seat is supported at an upper end of the bottom seat, the filter screen cylinder mechanism comprises a bottom plate and a top ring seat connected above the bottom plate through a plurality of groups of supporting plates, a filter screen plate is connected between adjacent supporting plates, and upper and lower ends of the filter screen plate are respectively fixed with the top ring seat and the bottom plate;

a lower end of the bottom plate is arranged with a plurality of groups of plug-in columns, and the plug-in columns are inserted into corresponding jacks on the rotating seat;

the end cover mechanism comprises a cover plate, a sealing ring seat fixed at a lower end of the cover plate and a feeding pipe arranged on a side of an upper end of the cover plate, and handles are also arranged at the upper end of the cover plate;

a hopper is arranged at a top of the feeding pipe, the cover plate is fixed at the top of the solid-liquid separation tank through snap locks, and the motor is fixed at a middle part of the upper end of the cover plate;

a bottom of the feeding pipe extends into the top ring seat, the sealing ring seat is inserted between an outer wall of the top ring seat and an inner wall of the solid-liquid separation tank, and a top of the top ring seat is abutted against a surface of the lower end of the cover plate;

the rotating shaft gear mechanism comprises a rotating shaft fixed after an output end of the motor penetrates through the cover plate, a big gear and a first pinion arranged at upper and lower ends on the same side of the bottom seat, and a second pinion connected after a bottom of the rotating shaft penetrates through the bottom plate, the rotating seat and the bottom seat, and the second pinion is meshed with the first pinion;

a vertical shaft connected to a middle part of a lower end of the big gear penetrates through the bottom seat and is connected to a middle part of an upper end of the first pinion, the big gear is located in an accommodation groove at a lower end of the rotating seat, an outer gear ring seat is fixed at a middle part of a lower end of the accommodation groove, and the big gear is meshed with the outer gear ring seat;

the rotating shaft gear mechanism also comprises an inclined rotating disc fixed at an upper part of the rotating shaft and an annular cylinder sleeved on the rotating shaft, a side of a top of the annular cylinder is connected to a U-shaped groove seat through an L-shaped frame, and a side of the inclined rotating disc is clamped at an interior of the U-shaped groove seat;

the rotating disc mechanism comprises a central connecting column and two groups of arc frames fixed on an outer side of the central connecting column through a plurality of groups of second connecting plates, and arc limit seats are connected between the two groups of arc frames;

the central connecting column is sleeved on the rotating shaft, projection plates are fixed on the rotating shaft, the projection plate is located in a bottom circular hole at a middle part of a lower end of the central connecting column, and the projection plates are slidably connected inside sliding grooves on a side of the bottom circular hole;

sides of a top circular hole at a middle part of an upper end of the central connecting column are arranged with slottings, two sides at tail ends of the slottings are arranged with fastening ear plates connected to the sides of the central connecting column, a bottom of the top circular hole is arranged with an annular groove, a bottom of the annular cylinder is connected to a rotating ring seat, the rotating ring seat is arranged in the annular groove, and two groups of fastening ear plates on the same side are fixedly connected by bolts; and upper and lower ends of the arc limit seats are also fixed with L-shaped seats, the rolling cylinders are located in the arc limit seats, two ends of the rolling cylinder are movably connected between upper and lower groups of L-shaped seats, and an inner side wall of the L-shaped seat is also fixed with stirring plates.

2. The solid-liquid separation mechanism for grain fermentation according to claim 1, wherein a side of a bottom of the solid-liquid separation tank is arranged with supporting legs, and a middle part of a lower end of the solid-liquid separation tank is connected to the funnel.

3. A solid-liquid separation method based on the solid-liquid separation mechanism for grain fermentation according to claim 1, specifically comprising the following steps:
   S1, putting the fermented grain into the filter screen cylinder mechanism, and starting the motor, causing the motor to drive the rotating disc mechanism to reciprocate up and down at the interior of the filter screen cylinder mechanism, for stirring the fermented grain at the interior of the filter screen cylinder mechanism;
   S2, driving, by the motor, the filter screen cylinder mechanism to rotate at the interior of the solid-liquid separation tank through the rotating shaft gear mechanism, and performing centrifugal solid-liquid separation on the fermented grain at the interior of the filter screen cylinder mechanism; and
   S3, making the rotating disc mechanism rotate at the interior of the filter screen cylinder mechanism, causing the rolling cylinders to perform rolling and solid-liquid separation on the fermented grain on the inner wall of the filter screen cylinder mechanism.

4. A solid-liquid separation method based on the solid-liquid separation mechanism for grain fermentation according to claim 2, specifically comprising the following steps:
   S1, putting the fermented grain into the filter screen cylinder mechanism, and starting the motor, causing the motor to drive the rotating disc mechanism to reciprocate up and down at the interior of the filter screen cylinder mechanism, for stirring the fermented grain at the interior of the filter screen cylinder mechanism;
   S2, driving, by the motor, the filter screen cylinder mechanism to rotate at the interior of the solid-liquid separation tank through the rotating shaft gear mechanism, and performing centrifugal solid-liquid separation on the fermented grain at the interior of the filter screen cylinder mechanism; and
   S3, making the rotating disc mechanism rotate at the interior of the filter screen cylinder mechanism, causing the rolling cylinders to perform rolling and solid-liquid separation on the fermented grain on the inner wall of the filter screen cylinder mechanism.

* * * * *